F. KEMPTER.
APPARATUS FOR WASHING CAOUTCHOUC, GUTTA PERCHA, AND SIMILAR SUBSTANCES.
APPLICATION FILED NOV. 7, 1907.

935,849.

Patented Oct. 5, 1909.
2 SHEETS—SHEET 1.

F. KEMPTER.
APPARATUS FOR WASHING CAOUTCHOUC, GUTTA PERCHA, AND SIMILAR SUBSTANCES.
APPLICATION FILED NOV. 7, 1907.

935,849.

Patented Oct. 5, 1909.
2 SHEETS—SHEET 2.

UNITED STATES PATENT OFFICE.

FRITZ KEMPTER, OF STUTTGART, GERMANY.

APPARATUS FOR WASHING CAOUTCHOUC, GUTTA-PERCHA, AND SIMILAR SUBSTANCES.

935,849.   Specification of Letters Patent.   Patented Oct. 5, 1909.

Application filed November 7, 1907. Serial No. 401,158.

*To all whom it may concern:*

Be it known that I, FRITZ KEMPTER, a subject of the German Emperor, residing at Stuttgart, Germany, have invented new and useful Improvements in Apparatus for Washing Caoutchouc, Gutta-Percha, and Similar Substances, of which the following is a specification.

In a co-pending patent application filed by me November 7, 1907, under Serial No. 401,157, is described an apparatus for washing caoutchouc and similar articles.

The invention which forms the subject-matter of the present application relates to an improvement on the apparatus described in the above application, and has for its object to provide additional efficient means for cutting up the mass under treatment.

Figure 1:
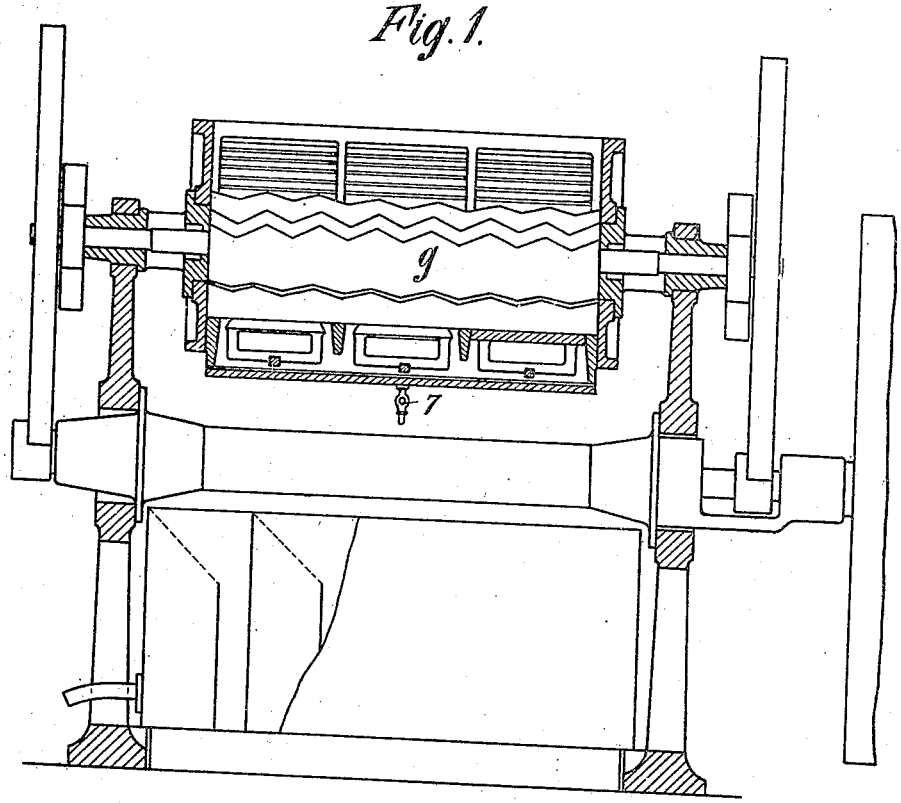
Figure 2:
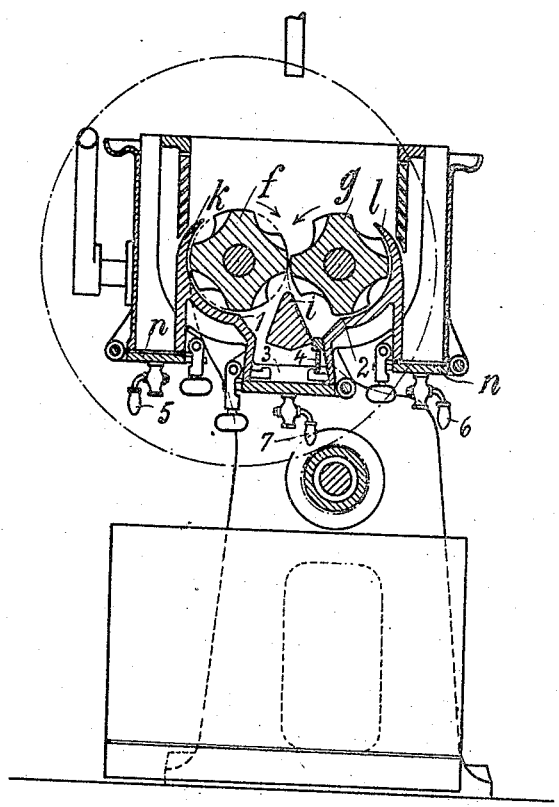

In the accompanying drawings: Figure 1 is a longitudinal section of my improved apparatus, and Fig. 2 a cross section thereof.

The arrangement of the crushing rollers $f$, $g$, and their position with regard to the stone catching and rejecting flanges $k$, $l$, are the same as described in the co-pending application hereinabove referred to.

The bottom of the trough or tank containing the rollers is first curved beneath part of the rollers and then slopes down abruptly to form an edge or cutting saddle 1, 2. By these saddles the material to be washed is submitted twice to the opening process at each revolution of the rollers. At the center, the bottom of the trough is provided with a pocket or channel 3, adapted for the collection of sand. Centered above this channel there is arranged between rollers $f$, $g$, a coniform main saddle $i$, between which and the side walls of the channel, there remain slots or escape openings. These openings may be closed, more or less, by exchangeable plates 4, which may be introduced from below by opening the hinged bottom of the channel.

The partial or entire closing of the openings is of importance, as some kinds of caoutchouc at the beginning of the treatment and when working with water of low temperature easily form fragments, the loss of which is prevented by closing the channels. If subsequently the caoutchouc is treated with hot water, the material to be washed will form a plastic mass, so that the closing plates may be entirely removed, or plates of smaller size be substituted. In this way the heavier impurities, such as sand, etc., which were separated at the beginning of the operation on the saddles, will escape through the slots into the channel, from which they may be readily removed.

As shown, not only the central channel 3, of the trough, but also the jacket $n$, is provided with a hinged bottom. These bottoms have outlet cocks 5, 6, and 7, for the escape of the water.

I claim:

A device of the character described, comprising a pair of crushing rollers, an inclosing tank having a concave bottom section beneath each roller, slopes adjoining the concave sections, a pocket intermediate the slopes, a saddle above the pocket, openings at the sides of the saddle, and means for partly or entirely closing said openings, substantially as specified.

In witness whereof, I have hereunto signed my name in the presence of two subscribing witnesses.

FRITZ KEMPTER.

Witnesses:
 ALEXANDER KRETSCHMER,
 ERNEST ENTENMANN.